(12) United States Patent
Boudjemaa et al.

(10) Patent No.: US 10,998,559 B2
(45) Date of Patent: May 4, 2021

(54) ELECTRICAL POWER SUPPLY DEVICE IN AN AIRCRAFT, AND A METHOD OF COOLING THE DEVICE

(71) Applicant: SAFRAN POWER UNITS, Toulouse (FR)

(72) Inventors: Fabien Boudjemaa, Moissy-Cramayel (FR); Adrien Gasse, Moissy-Cramayel (FR); Matthieu Baron, Moissy-Cramayel (FR); Denis Real, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 138 days.

(21) Appl. No.: 16/333,413

(22) PCT Filed: Sep. 12, 2017

(86) PCT No.: PCT/FR2017/052416
§ 371 (c)(1),
(2) Date: Mar. 14, 2019

(87) PCT Pub. No.: WO2018/051004
PCT Pub. Date: Mar. 22, 2018

(65) Prior Publication Data
US 2019/0252696 A1    Aug. 15, 2019

(30) Foreign Application Priority Data

Sep. 15, 2016  (FR) ........................................ 1658640

(51) Int. Cl.
*H01M 8/04* (2016.01)
*H01M 8/04014* (2016.01)
(Continued)

(52) U.S. Cl.
CPC ........ *H01M 8/04014* (2013.01); *B64D 33/04* (2013.01); *B64D 41/00* (2013.01);
(Continued)

(58) Field of Classification Search
CPC ...................... H01M 8/04014; H01M 8/04701
See application file for complete search history.

(56) References Cited

U.S. PATENT DOCUMENTS

2010/0285377 A1* 11/2010 Tamura ............... H01M 8/0618
429/423
2011/0048147 A1*  3/2011 Keech ................... B64C 13/341
74/89.26

(Continued)

FOREIGN PATENT DOCUMENTS

EP    2 991 144 A1    3/2016
FR    3 013 683 A1    5/2015

OTHER PUBLICATIONS

International Search Report dated Jan. 10, 2018 in PCT/FR2017/052416 filed Sep. 12, 2017.

*Primary Examiner* — Olatunji A Godo
(74) *Attorney, Agent, or Firm* — Oblon, McClelland, Maier & Neustadt, L.L.P.

(57) ABSTRACT

An electrical power supply device in an aircraft, the device including an enclosure, the enclosure containing at least: a fuel cell; a dihydrogen generator; a gas feed circuit connecting the dihydrogen generator to the anode of the fuel cell; an oxygen feed device feeding the cathode of the fuel cell; and a cooling circuit of the fuel cell associated with at least one heat exchanger; wherein the enclosure is mounted on an actuator system, the actuator system being configured to move the enclosure from a first position in which the
(Continued)

enclosure is housed inside an outer wall of the aircraft, to a second position in which the enclosure projects from the outer wall.

12 Claims, 5 Drawing Sheets

(51) Int. Cl.
    *B64D 41/00*     (2006.01)
    *B64D 33/04*     (2006.01)
    *H01M 8/04701*     (2016.01)

(52) U.S. Cl.
    CPC ... *H01M 8/04701* (2013.01); *B64D 2041/005* (2013.01); *H01M 2250/20* (2013.01); *Y02T 90/40* (2013.01)

(56) References Cited

U.S. PATENT DOCUMENTS

| | | |
|---|---|---|
| 2016/0064751 A1 | 3/2016 | Hoffjann et al. |
| 2016/0159466 A1 | 6/2016 | Daggett et al. |
| 2017/0166320 A1 | 6/2017 | Rideau et al. |

\* cited by examiner

ELECTRICAL POWER SUPPLY DEVICE IN AN AIRCRAFT, AND A METHOD OF COOLING THE DEVICE

BACKGROUND OF THE INVENTION

The invention relates to an electrical power supply device in an aircraft and to a method of cooling the power supply device.

Emergency power units (EPUs) serve to supply emergency power in the event of primary electricity generators being lost, and they serve in particular to provide electrical power for flight controls during a stage of landing the aircraft.

Various electricity generator systems are known for EPUs in the state of the art. Such systems may comprise an electricity-producing fuel cell having an anode connected to a supply of gas under pressure. By way of example, a high temperature—proton exchange membrane fuel cell (HT-PEMFC) may be associated with a hydrogen generator and may serve to supply electricity to an electronic power unit while operating at temperatures in the range 110° C. to 220° C. under steady conditions. Such a fuel cell has the particular advantage of presenting high energy efficiency, typically of the order of 50%.

In order to operate in this temperature range, an HT-PEMFC type fuel cell requires heat energy to be discharged that is not less than the electrical energy it produces: for example, a system operating at 15 kilowatts electrical (kWe) requires at least 15 kilowatts thermal (kWth) to be discharged. The system surrounding the fuel cell, in particular the gas generator and the power electronics powered by the fuel cell, also requires a cooling system.

One solution envisaged for discharging the heat energy from the fuel cell could rely on an environmental control system (ECS) of the aircraft. Nevertheless, such a solution is found to be limited, in particular for business aircraft, since the ECS is capable of discharging only a few kWth (generally about 5 kWth). Another solution might consist in using a liquid cold source in order to cool the fuel cell, however such a cold source is not always available, in particular on board business aircraft. Another solution might be to use a system for taking in outside air, e.g. with the help of a scoop. Nevertheless, such a system for taking in air degrades the performance of the aircraft during nominal operation, and does so even in the absence of a failure of the primary electricity generators. Specifically, such a system for taking in air would permanently degrade the aerodynamics and the drag of the aircraft and would also involve an increase in size and in weight.

The solutions proposed below therefore do not enable a high temperature fuel cell to discharge sufficient heat energy or else they seriously degrade the performance of the aircraft.

OBJECT AND SUMMARY OF THE INVENTION

The present invention seeks to remedy the above-mentioned drawbacks.

To this end, the invention provides an electrical power supply device in an aircraft, the device comprising an enclosure, the enclosure containing at least:
- a fuel cell for generating electricity and comprising an anode and a cathode;
- a dihydrogen generator;
- a gas feed circuit connecting the dihydrogen generator to the anode of the fuel cell;
- an oxygen feed device configured to feed the cathode of the fuel cell; and
- a cooling circuit for cooling the fuel cell and associated with at least one heat exchanger;

the device being characterized in that the enclosure is mounted on an actuator system, the actuator system being configured to move the enclosure from a first position in which the enclosure is housed inside an outer wall of the aircraft, to a second position in which the enclosure projects from the outer wall of the aircraft.

This device is particularly advantageous in that when the enclosure is deployed into the second position, air from outside the aircraft serves to cool it, and thus provide passive regulation of the temperature of the components of the device. This regulation serves in particular to cool the fuel cell, the power electronics associated therewith, and the dihydrogen generator. It then becomes possible to integrate a high power fuel cell on board an aircraft of small size, whereas in the past this type of fuel cell has been unsuitable. Another advantage of deploying the enclosure into the second position is associated with the fact that hydrogen leaving the fuel cell can be discharged directly to outside the aircraft. Furthermore, by offsetting the dihydrogen generator to outside the aircraft while it is in operation serves to prevent any risk of dihydrogen leaking into the hold or the cabin of the aircraft, thereby improving safety.

In another aspect, in this power supply device, the enclosure includes at least one upstream opening and at least one downstream opening, "upstream" and "downstream" being relative to the flight direction of the aircraft.

In another aspect, in this power supply device, the heat exchanger is arranged at the upstream end of the enclosure and the dihydrogen generator is arranged at the downstream end of the enclosure, "upstream" and "downstream" being relative to the flight direction of the aircraft.

In another aspect, in this power supply device, the dihydrogen generator is arranged at the upstream end of the enclosure and the heat exchanger is arranged at the downstream end of the enclosure, "upstream" and "downstream" being relative to the flight direction of the aircraft.

In another aspect, in this power supply device, the enclosure further comprises a fan configured to discharge the heat energy generated by the fuel cell when the enclosure is in the second position and the travel speed of the aircraft is below a predetermined threshold.

In another aspect, in this power supply device, the actuator system comprises mechanical movement means configured to move the enclosure from the first position to the second position.

In another aspect, in this power supply device, the actuator system comprises electromagnetic movement means configured to move the enclosure from the first position to the second position.

In another aspect, in this power supply device, the fuel cell is a high temperature proton exchange membrane fuel cell.

The invention also provides a method of cooling an electrical power supply device, the power supply device comprising an enclosure, the enclosure containing at least:
- a fuel cell for generating electricity and comprising an anode and a cathode;
- a dihydrogen generator;
- a gas feed circuit connecting the dihydrogen generator to the anode of the fuel cell;
- an oxygen feed device configured to feed the cathode of the fuel cell; and a cooling circuit for cooling the fuel cell and associated with at least one heat exchanger;

the method being characterized in that it comprises moving the enclosure from a first position in which the enclosure is housed inside an outer wall of the aircraft to a second position in which the enclosure projects from the outer wall of the aircraft.

In another aspect, the method further comprises a step of using a fan to ventilate the inside of the enclosure when the enclosure is in the second position and the travel speed of the aircraft is below a predetermined threshold.

BRIEF DESCRIPTION OF THE DRAWINGS

Other characteristics and advantages of the invention appear from the following description of particular embodiments of the invention, given as non-limiting examples, and with reference to the accompanying drawings, in which.

DETAILED DESCRIPTION OF EMBODIMENTS

Figure 1:
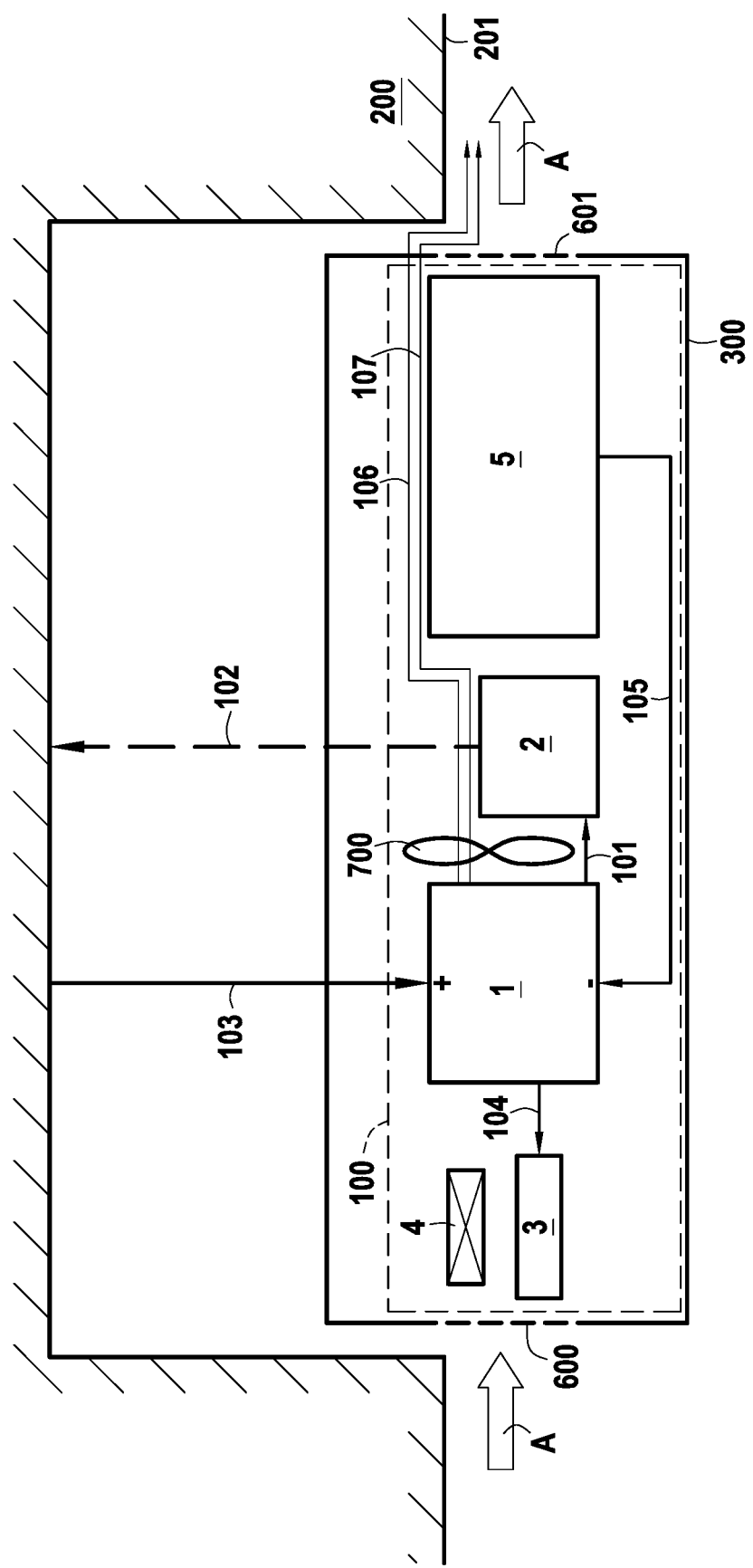
FIG. 1 is a side view of an aircraft including a power supply device with an enclosure in an embodiment of the invention.
Figure 2:
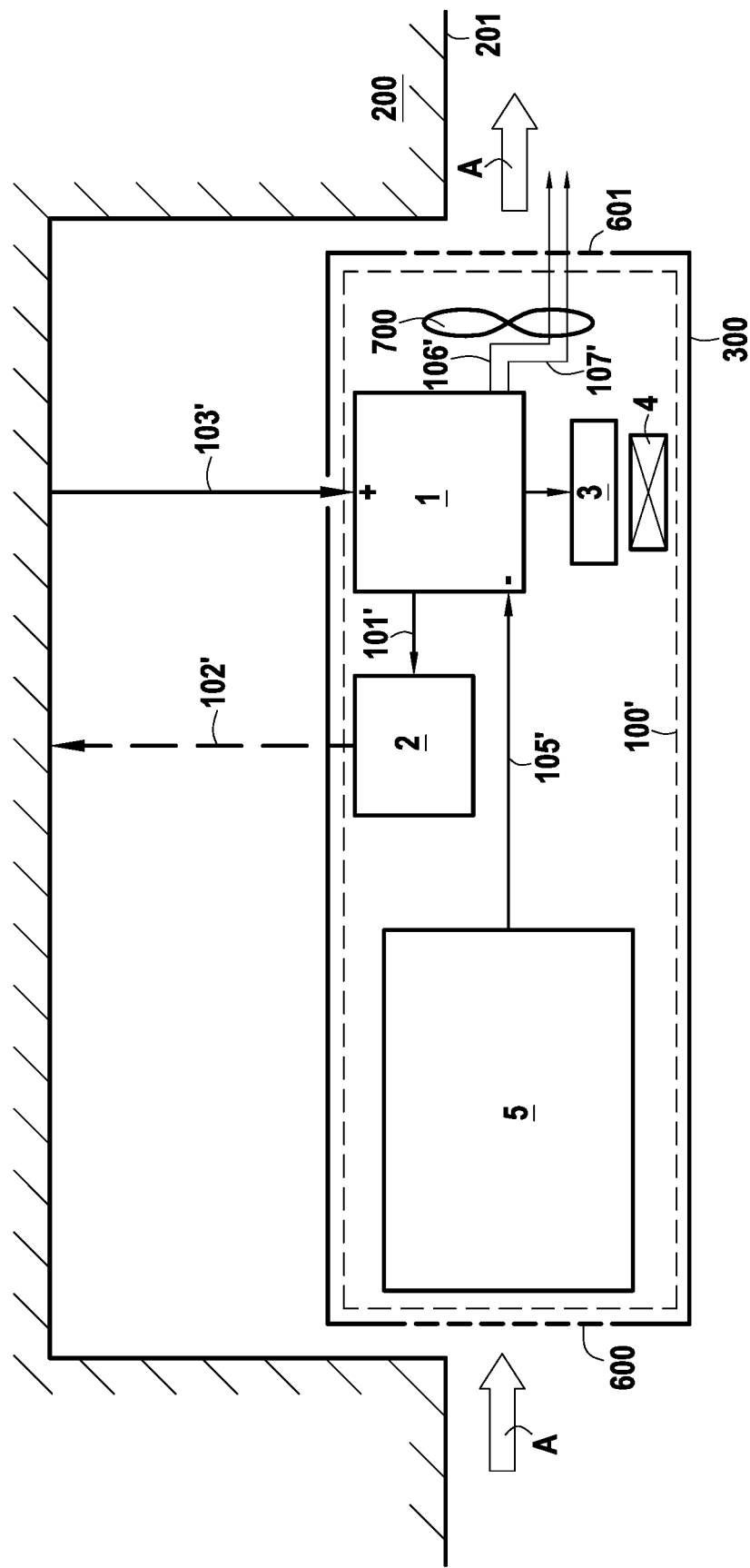
FIG. 2 is a side view of an aircraft including a power supply device with an enclosure in another embodiment of the invention.

FIGS. 1 and 2 are simplified diagrams showing the architecture of an electrical power supply device of an aircraft 200. The device comprises an electricity generator system 100, 100', e.g. used for providing the emergency power unit (EPU) of the aircraft 200.

The system 100, 100' comprises a fuel cell 1 for generating the electricity that is to be supplied (arrows 101, 101') to an electronic power unit 2. The power electronics 2 power (dashed arrows 102, 102') various electrical loads of the aircraft 200, such as its flight controls, in the event of the primary electricity generators being lost.

The fuel cell 1 has a cathode + and an anode −. Optionally, by way of example, the fuel cell is a high temperature proton exchange membrane fuel cell (HT-PEMFC). An oxygen feed device (not shown) feeds the cathode + of the fuel cell 1 with oxygen (arrows 103, 103'). By way of example, such an oxygen feed device may be constituted by a cylinder of oxygen under pressure or by filtering and then compressing air taken from the cabin of the aircraft 200. The fuel cell 1 is also interfaced with a cooling circuit 3 that is associated with at least one heat exchanger 4. The fuel cell 1 thus discharges (arrows 104, 104') a portion of the heat energy generated via the cooling circuit 3.

A dihydrogen generator 5 is connected (arrows 105, 105') via a gas feed circuit (not shown) to the anode − of the fuel cell 1. By way of example, the dihydrogen generator 5 is a pyrotechnic gas generator. In known manner, such a generator may have one or more housings, each containing a pyrotechnic charge in the form of a block in a single piece or of a granular material. An electrically- or mechanically-triggered ignition device serves to ignite the pyrotechnic charges, thereby leading to their combustion and releasing gas from that combustion. Selecting the composition, the dimensions, and the running duration of the pyrotechnic charges in order to provide such a dihydrogen generator forms part of the knowledge to the person skilled in the art. The gas resulting from the combustion may pass directly into the gas feed circuit or it may flow into a storage chamber connected to that circuit. Prior to reaching the anode − of the fuel cell 1, the gas resulting from combustion may pass through an expander so as to reduce its pressure, followed by a thermal conditioner so as to reduce its temperature in order to be adapted to the operating conditions of the fuel cell. The thermal conditioner may also be cooled using the cooling circuit 3 of the fuel cell 1.

In a variant, the dihydrogen generator 5 may be a gas storage device, e.g. a cylinder of hydrogen under pressure.

The system 100, 100' further comprises a hydrogen exhaust line (arrows 106, 106') and an oxygen exhaust line (arrows 107, 107') through which hydrogen and oxygen flow respectively in order to be discharged to the outside of the system. A pressure regulator device including at least one pressure sensor, discharge valves, or solenoid discharge valves, is associated with the exhaust lines and serves to control the discharge of oxygen or hydrogen when the pressure in the system 100, 100' exceeds a predetermined value.

The above-described energy generator system 100, 100' is known to the person skilled in the art.

According to the invention, the system 100, 100' is placed in a closed volume, e.g. an enclosure 300. The enclosure 300 is associated with an actuator system enabling it to be moved from a first position in which it is housed inside an outer wall 201 of the aircraft 200, to a second position in which the enclosure projects from the outer wall 201 of the aircraft 200.

Figure 3A:
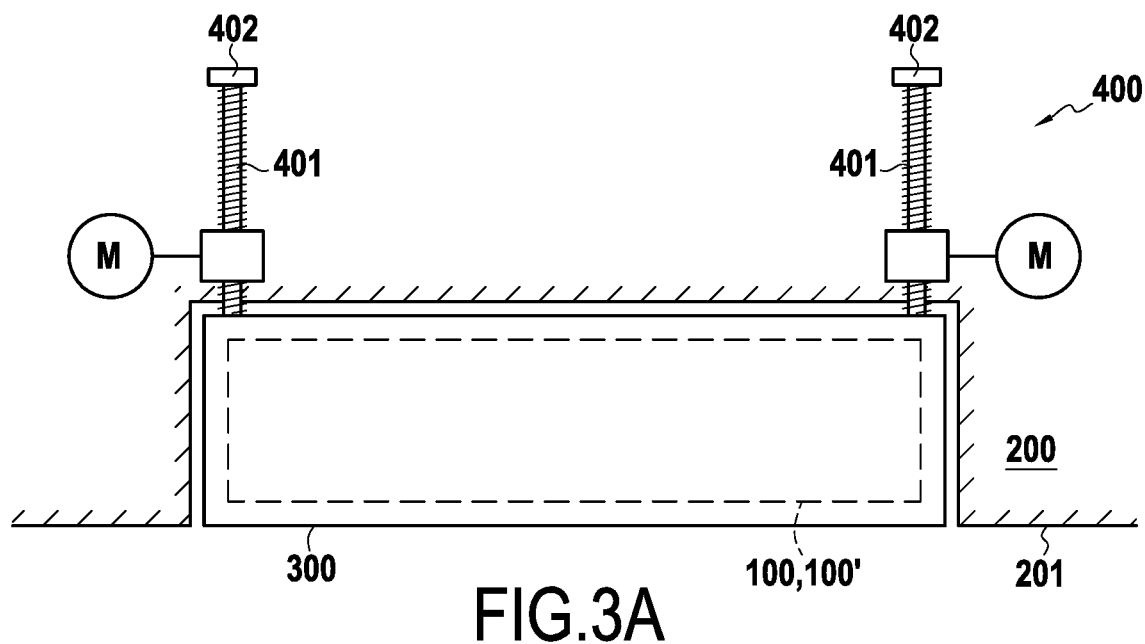
FIGS. 3A and 3B are side views of an aircraft including an actuator system for an enclosure of a power supply device in an embodiment of the invention.
Figure 3B:
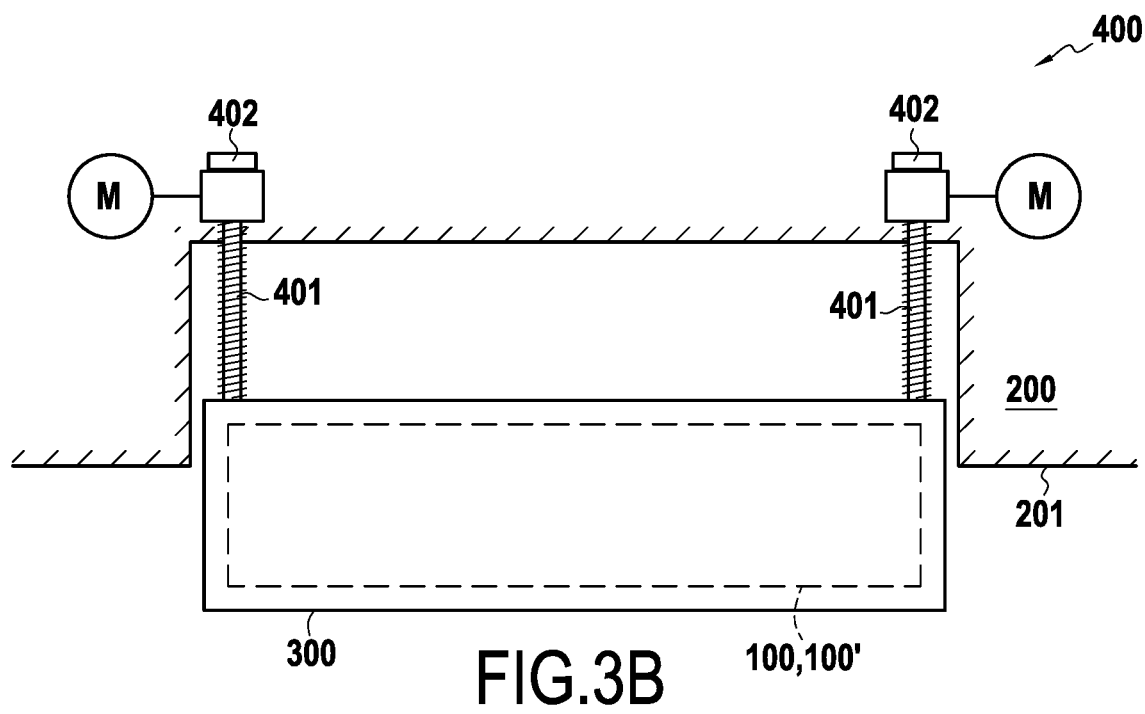
Figure 4A:
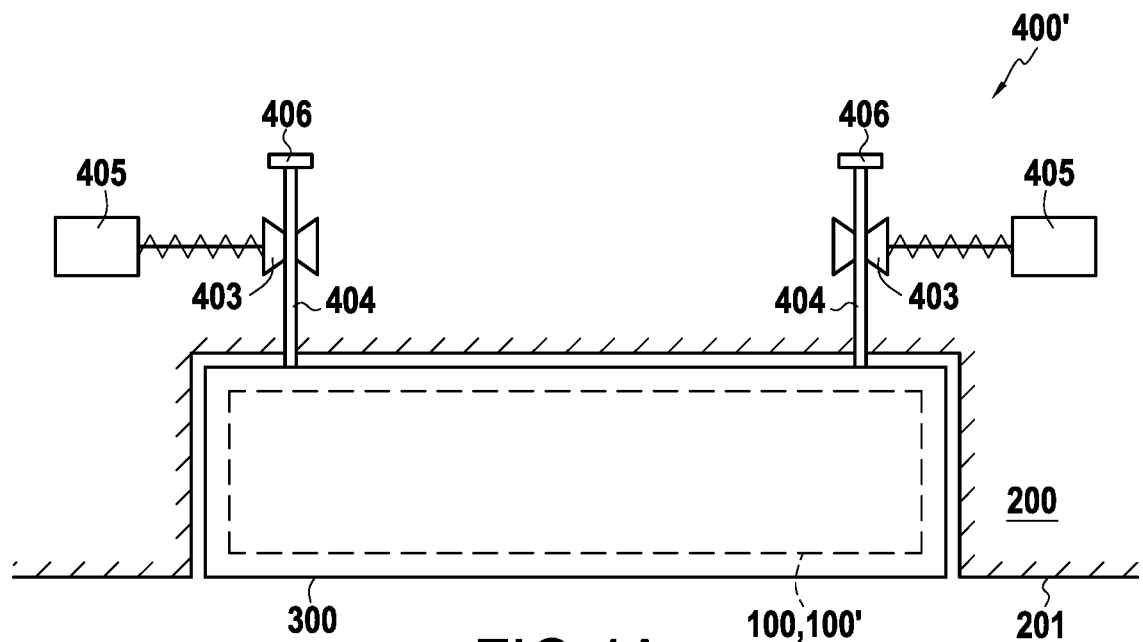
FIGS. 4A and 4B are side views of an aircraft including an actuator system for an enclosure of a power supply device in another embodiment of the invention.
Figure 4B:
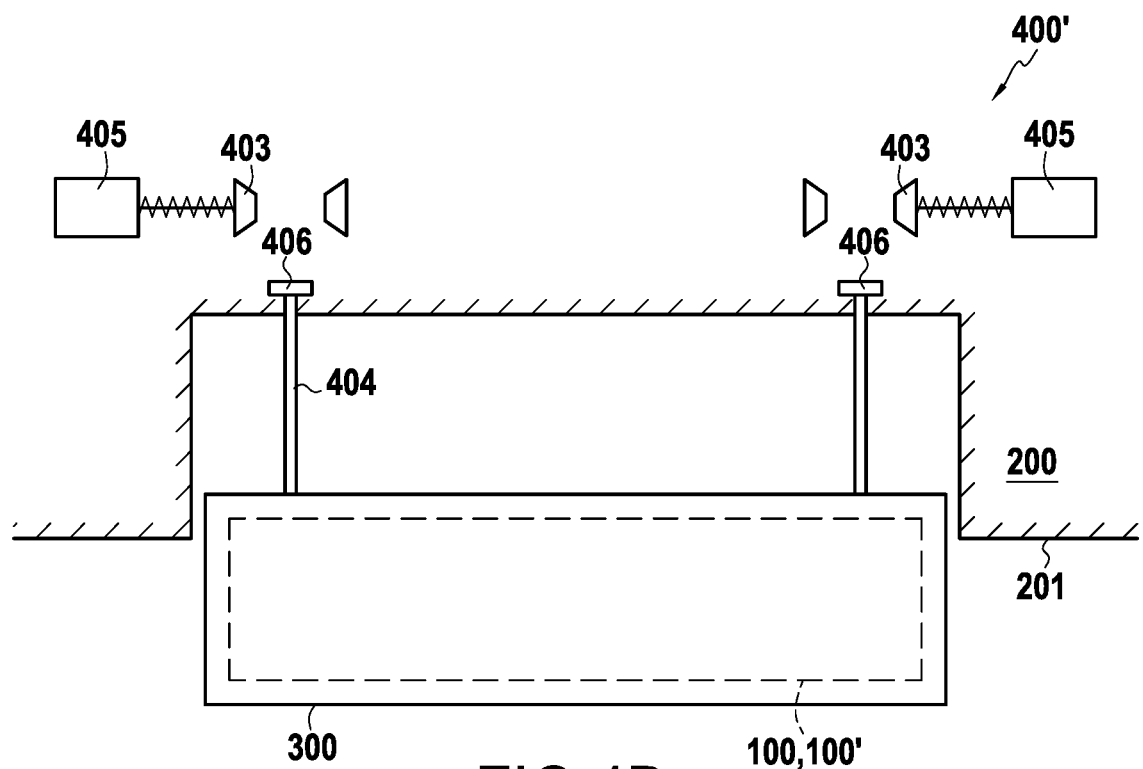
Figure 5A:
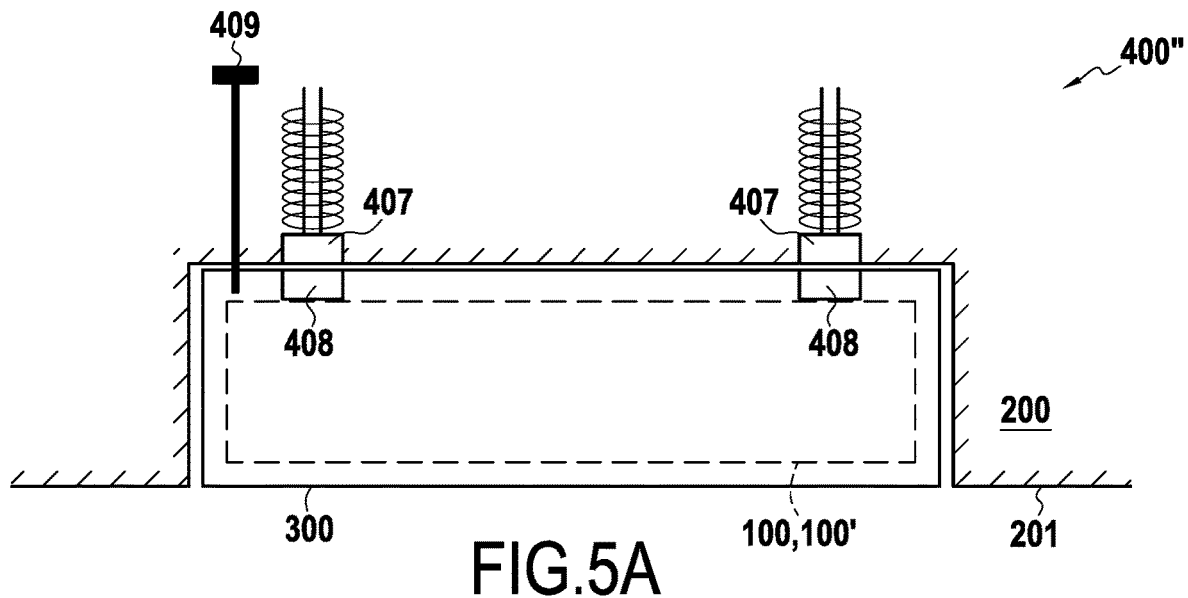
FIGS. 5A and 5B are side views of an aircraft including an actuator system for an enclosure of a power supply device in another embodiment of the invention.

FIGS. 3A, 4A, and 5A show the enclosure 300 in the first position, while FIGS. 1, 2, 3B, 4B, and 5B show the enclosure 300 in the second position.

Various examples of actuator systems 400, 400', 400" for moving the enclosure 300 are shown in FIGS. 3A-5B.

FIGS. 3A-4B show actuator systems 400, 400' making use of mechanical movement means.

In FIGS. 3A and 3B, the enclosure 300 is moved by using one or more motor-driven wormscrews 401 providing the connection between the enclosure 300 and the aircraft 200. Each wormscrew 401 is rotated using at least one motor M. In the event of losing the primary generators of the aircraft 200, the motor-driven wormscrews are operated to move the enclosure 300 from the first position (FIG. 3A) to the second position (FIG. 3B). At the end of the stroke of the motor-driven wormscrews 401, abutments 402 placed at the ends of the wormscrews 401 serve to hold the enclosure 300 to the aircraft 200 once the enclosure 300 has reached the second position. As an alternative to wormscrews 401, the enclosure may be moved by actuators controlled by the motors M.

In FIG. 4A, the enclosure 300 is held in the first position by holder jaws 403 serving to hold rods 404 connecting the enclosure 300 to the aircraft 200. In the event of losing the primary generators of the aircraft 200, pyrotechnic elements 405 are actuated so as to trigger opening of the holder jaws 403, thereby releasing the rods 404 from the holder jaws 403. Under the effect of its weight, the enclosure 300 then moves towards the second position taking the rods 404 with it as it moves. Abutments 406 arranged at the ends of the rods 404 then serve to hold the enclosure 300 to the aircraft 200 once the enclosure 300 has reached the second position (FIG. 4B).

Figure 5B:
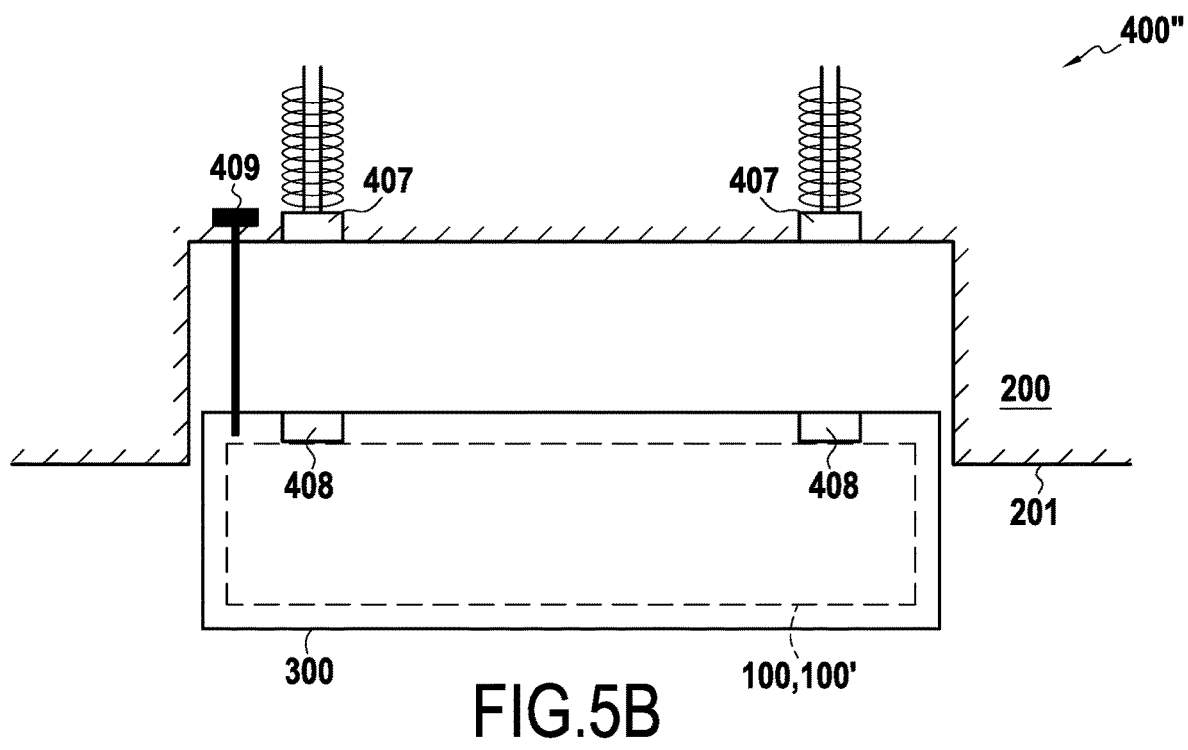

FIGS. 5A and 5B show an example of an actuator system 400″ including electromagnetic movement means. Electromagnets 407 arranged in the aircraft 200 hold the enclosure 300 in the first position by exerting an electromagnetic field on magnets 408 arranged in the enclosure 300 (FIG. 5A). In the event of losing the primary generators of the aircraft 200, the electromagnets 407 are configured to cease exerting the electromagnetic field on the magnets 408, and under the effect of its own weight the enclosure then moves to the second position. At least one mechanical abutment 409 then serves to hold the enclosure 300 to the aircraft 200 once the enclosure 300 has reached the second position (FIG. 5B).

FIGS. 1 and 2 show the enclosure 300 in the second position, i.e. projecting from the outer wall 201 of the aircraft. Advantageously, putting the enclosure 300 into contact with the air outside the aircraft 200 serves to cool it and thereby provides passive regulation of the temperature of the components present in the electricity generator system 100, 100′, in particular by cooling the fuel cell 1, the power electronics, and the dihydrogen generator 5.

Furthermore, in order to improve the cooling of the enclosure 300, at least one upstream opening 600 and at least one downstream opening 601 may be formed in the enclosure 300, with positions being said herein to be "upstream" and "downstream" relative to the flight direction of the aircraft 200. By way of example, FIGS. 1 and 2 show multiply perforated grids 600 and 601 arranged respectively at the upstream and downstream ends of the enclosure 300. Thus, when the enclosure 300 is deployed into the second position, an air stream A passes through the enclosure from upstream to downstream, thereby cooling the electricity generator system 100, 100′.

Another advantage of deploying the enclosure 300 into the second position is associated with the presence of the hydrogen exhaust line: hydrogen at the outlet from the fuel cell 1 can then be discharged directly to the outside of the aircraft 200 with the air stream A.

Furthermore, offsetting the dihydrogen generator 5 to outside the aircraft 200 when the electricity generator system 100, 100′ is put into operation serves to avoid any risk of dihydrogen leaking into the cabin or into the hold of the aircraft 200, thereby improving safety.

In order to cool the components present in the system 100, 100′, various arrangements of those components may be envisaged.

In a first embodiment shown in FIG. 1, the heat exchanger 4 associated with the cooling circuit 3 for the fuel cell 1 is arranged at the upstream end of the enclosure 300, e.g. as close as possible to the air stream A entering through the opening 600, so as to present the lowest possible temperature. The fuel cell 1 thus has a cooling circuit 3 suitable for discharging the heat energy needed to enable it to operate. The power electronics 2, having an operating temperature that typically should not exceed 80° C., is then arranged downstream from the heat exchanger 4. Finally, the dihydrogen generator 5 of temperature that may exceed 200° C. is arranged at the downstream end of the enclosure 300, e.g. as close as possible to the opening 601 through which the outgoing air stream A passes, this configuration serving to dissipate the heat generated by the dihydrogen generator. Only one heat exchanger 4 is shown in this example, however it should be understood that a plurality of heat exchangers could be arranged at the upstream end of the enclosure 300.

In a second embodiment shown in FIG. 2, the dihydrogen generator 5 of temperature that may exceed 200° C. is arranged at the upstream end of the enclosure 300, e.g. as close as possible to the air stream A entering through the opening 600. The power electronics 2 and the fuel cell 1 are then located downstream from the dihydrogen generator 5. The heat exchanger 4 associated with the cooling circuit 3 of the fuel cell 1 is arranged at the downstream end of the enclosure 300, e.g. as close as possible to the air stream exiting via the opening 601. Advantageously, as a result of such a configuration, the air stream A entering the enclosure 300 at its upstream end cools the dihydrogen generator 5, and the heat generated by the dihydrogen generator 5 heats the air stream. The air stream as heated in this way then goes from upstream to downstream in the enclosure 300 and thus presents a temperature that is appropriate both for avoiding any risk of icing in the components of the system 100′, in particular the power electronics 2, and sufficient for enabling the heat exchanger 4 to cool the fuel cell 1.

Furthermore, the systems 100, 100′ may include a fan 700 configured to suck in air from outside the aircraft and discharge the heat energy needed for proper operation of the fuel cell. Thus, when the enclosure 300 is in the second position, and the speed of the aircraft drops below a predetermined threshold, the fan 700 is caused to operate. Such a situation may occur at the end of a flight, when the speed of the aircraft 200 drops together with its altitude. The fan 700 may then discharge a portion of the heat given off by the fuel cell 1 and the hydrogen generator 5.

The invention claimed is:

1. An electrical power supply device in an aircraft, the device comprising:
    an enclosure, the enclosure containing at least:
        a fuel cell for generating electricity and comprising an anode and a cathode;
        a dihydrogen generator;
        a gas feed circuit connecting the dihydrogen generator to the anode of the fuel cell;
        an oxygen feed device configured to feed the cathode of the fuel cell; and
        a cooling circuit for cooling the fuel cell and associated with at least one heat exchanger,
    wherein the enclosure is mounted on an actuator system, the actuator system being configured to move the enclosure from a first position wherein the enclosure is housed inside an outer wall of the aircraft, to a second position wherein the enclosure projects from the outer wall of the aircraft when a primary generator of the aircraft is lost.

2. The power supply device according to claim 1, wherein the enclosure includes at least one upstream opening and at least one downstream opening, upstream and downstream being relative to a flight direction of the aircraft.

3. The power supply device according to claim 1, wherein the heat exchanger is arranged at an upstream end of the enclosure and the dihydrogen generator is arranged at a downstream end of the enclosure, upstream and downstream being relative to a flight direction of the aircraft.

4. The power supply device according to claim 1, wherein the dihydrogen generator is arranged at an upstream end of the enclosure and the heat exchanger is arranged at a downstream end of the enclosure, upstream and downstream being relative to a flight direction of the aircraft.

5. The power supply device according to claim 1, wherein the enclosure further comprises a fan configured to discharge heat energy generated by the fuel cell when the enclosure is in the second position and a travel speed of the aircraft is below a predetermined threshold.

6. The power supply device according to claim 1, wherein the actuator system comprises mechanical movement means configured to move the enclosure from the first position to the second position.

7. The power supply device according to claim 1, wherein the actuator system comprises electromagnetic movement means configured to move the enclosure from the first position to the second position.

8. The power supply device according to claim 1, wherein the fuel cell is a high temperature proton exchange membrane fuel cell.

9. A method of cooling an electrical power supply device in an aircraft, the power supply device comprising an enclosure, the enclosure containing at least:
   a fuel cell for generating electricity and comprising an anode and a cathode;
   a dihydrogen generator;
   a gas feed circuit connecting the dihydrogen generator to the anode of the fuel cell;
   an oxygen feed device configured to feed the cathode of the fuel cell; and
   a cooling circuit for cooling the fuel cell and associated with at least one heat exchanger, the method comprising:
   moving the enclosure from a first position wherein the enclosure is housed inside an outer wall of the aircraft to a second position wherein the enclosure projects from the outer wall of the aircraft when a primary generator of the aircraft is lost.

10. The method according to claim 9, further comprising using a fan to ventilate an inside of the enclosure when the enclosure is in the second position and a travel speed of the aircraft is below a predetermined threshold.

11. The power supply device according to claim 1, wherein in the first position, a wall of the enclosure is aligned with the outer wall of the aircraft.

12. The method according to claim 9, wherein in the first position, a wall of the enclosure is aligned with the outer wall of the aircraft.

* * * * *